United States Patent [19]

Akutsu

[11] Patent Number: 4,874,439

[45] Date of Patent: Oct. 17, 1989

[54] SYNCHRONIZER RING IN SPEED VARIATOR MADE OF WEAR-RESISTANT COPPER ALLOY HAVING HIGH STRENGTH AND TOUGHNESS

[75] Inventor: Hidetoshi Akutsu, Saitama, Japan

[73] Assignee: Mitsubishi Kinzoku Kabushiki Kaisha, Tokyo, Japan

[21] Appl. No.: 157,634

[22] Filed: Feb. 18, 1988

[30] Foreign Application Priority Data

| Feb. 24, 1987 | [JP] | Japan | 62-40661 |
| Feb. 24, 1987 | [JP] | Japan | 62-40662 |
| Aug. 25, 1987 | [JP] | Japan | 62-210671 |
| Aug. 25, 1987 | [JP] | Japan | 62-210672 |
| Aug. 25, 1987 | [JP] | Japan | 62-210673 |
| Aug. 25, 1987 | [JP] | Japan | 62-210674 |
| Aug. 25, 1987 | [JP] | Japan | 62-210675 |

[51] Int. Cl.$^4$ ............................................. C22C 9/00
[52] U.S. Cl. ..................................... 148/433; 148/434; 420/471; 420/478; 420/479; 420/480; 192/107 M
[58] Field of Search ............... 420/471, 472, 473, 476, 420/478, 479, 480; 192/107 M; 148/433, 434

[56] References Cited

FOREIGN PATENT DOCUMENTS

| 28789 | 11/1969 | Japan | 420/480 |
| 100913 | 9/1978 | Japan | 420/478 |
| 127741 | 10/1978 | Japan | 420/471 |
| 177342 | 10/1984 | Japan | 420/478 |
| 86237 | 5/1985 | Japan | 420/471 |
| 114545 | 6/1985 | Japan | 420/471 |
| 149740 | 8/1985 | Japan | 420/471 |

Primary Examiner—L. Dewayne Rutledge
Assistant Examiner—George Wyszomierski
Attorney, Agent, or Firm—Frishauf, Holtz, Goodman & Woodward

[57] ABSTRACT

A synchronizer ring for use in an automotive speed variator. The ring not only has high strength and toughness but also exhibits high wear resistance, as well as good synchronizing characteristics with respect to a mating member as expressed in terms of friction coefficient. The Cu alloy of which this ring is made has one of the following compositions: (1) 17–40% Zn (all percents are on a weight basis), 2–11% Al and 50–3,000 ppm of oxygen, as well as 0.1–3.5% of at least one element selected from among Ti, Zr and V, 0.003–0.3% Mg and with at least one optional element selected from among Fe, Ni, Co, P, Ca, Mn, Sn, Si and Pb, the balance being Cu and incidental impurities; or (2) 17–40% Zn, 2–11% Al, 0.5–6% Mn, 0.1–2% Si, 0.1–3% of at least one of Fe, Ni and Co, 0.003–0.3% of Mg, and 30–1,000 ppm of oxygen, with at least one optional element selected from among P, Ca, Cr, Pb and Sn, and with the balance being Cu and incidental impurities. In these two compositions, intermetallic compounds and oxides are uniformly dispersed in the matrix.

10 Claims, 1 Drawing Sheet

SYNCHRONIZER RING IN SPEED VARIATOR MADE OF WEAR-RESISTANT COPPER ALLOY HAVING HIGH STRENGTH AND TOUGHNESS

BACKGROUND OF THE INVENTION

The present invention relates to a synchronizer ring for use in automotive speed variators that has not only high strength and toughness but also improved wear resistance, as well as good synchronization characteristics with respect to the mating member as expressed in terms of friction coefficient.

Synchronizer rings are conventionally made of aluminum bronze, high strength brass and other copper alloys that satisfy the requirements for high strength, high toughness, high wear resistance and high friction coefficient.

A perspective view of a typical synchronizer ring for use in a speed variator is shown in FIG. 1. The inner surface 1 of the ring is subjected to intermittent surface contact with a rotating tapered cone under high pressure and the outer circumference of the ring is provided with spaced chamfers 2 that mesh with chamfers on a mating hub sleeve. In order for the synchronizer ring to exhibit its function, it must have high strength, high wear resistance and high compatibility with the mating member. Synchronizer rings have, therefore, been commonly fabricated of high strength brass and other copper compounds that possess these characteristics.

The demand for reducing the size and weight of automotive speed variators and for increasing their output is constantly growing and this has caused the need to develop a synchronizer ring that offers an even higher strength, toughness, wear resistance and friction coefficient. However, these requirements cannot be fully met by the prior art synchronizer rings made of existing copper alloys such as aluminum bronze and high-strength brass.

The present inventor has, therefore, conducted studies in order to develop a synchronizer ring made of a structural material that is capable of satisfying the above-mentioned requirement of automotive speed variators for a smaller size, a lighter weight and a larger output. As a result, the present inventor has found that this objective can be attained by either one of the following synchronizer rings:
  (1) A synchronizer ring made of a Cu alloy that contains 17–40% Zn (all percents being on a weight basis), 2–11% Al and 50–3,000 ppm of oxygen, as well as 0.1–3.5% of at least one of Ti, Zr and V, with at least one optional element selected from among 0–3% of at least one of Fe, Ni and Co, 0–0.3% of at least one of P, Mg and Ca, 0.1–4% Mn, 0.05–1.5% Pb, 0.05–2.5% Sn and 0.005–0.5% Si, and with the balance being Cu and incidental impurities, said alloy having such a structure that intermetallic compounds and oxides are uniformly dispersed in a matrix; or
  (2) A synchronizer ring made of a Cu alloy that contains 17–40% Zn (all percents being on a weight basis), 2–11% Al, 0.5–6% Mn, 0.1–2% Si, 0.1–3% of at least one of Fe, Ni and Co, 0.003–0.3% of at least one of P, Mg and Ca, and 30–1,000 ppm of oxygen, with either 0–1% (preferably 0.05–1%) Cr or 0–2% (preferably 0.05–2%) of at least one of Pb and Sn or both being present as optional elements, and the balance being Cu and incidental impurities, said alloy having such a structure that intermetallic compounds and oxides are uniformly dispersed in a matrix.

Both of these alloys specified above have high strength, high toughness, as well as high wear resistance and friction coefficient. Therefore, synchronizer rings made of these alloys enable the manufacture of an automotive transmission that is smaller in size and lighter in weight and which exhibits a higher performance.

SUMMARY OF THE INVENTION

The synchronizer ring of the present invention is made of a Cu alloy having high strength, high toughness and high wear resistance. This Cu alloy has either one of the following compositions:
  (1) It contains 17–40% Zn (all percents being on a weight basis), 2–11% Al and 50–3,000 ppm of oxygen, as well as 0.1–3.5% of at least one of Ti, Zr and V and an optional element selected from among 0–3% of at least one of Fe, Ni and Co, 0–0.3% of at least one of P, Mg and Ca, 0–2.5% Sn, 0–0.5% Si, 0–4% Mn and 0–1.5% Pb, and with the balance being Cu and incidental impurities; or
  (2) It contains 17–40% Zn, 2–11% Al, 0.5–6% Mn, 0.1–2% Si, 0.1–3% of at least one of Fe, Ni and Co, 0.003–0.3% of at least one of P, Mg and Ca, 30–1,000 ppm of oxygen, and an optional element selected from among 0–1% Cr and 0–2% of at least one of Pb and Sn, and the balance being Cu and incidental impurities. In either case, the Cu alloy has such a structure that intermetallic compounds and oxides are uniformly dispersed in a matrix.

DETAILED DESCRIPTION OF THE INVENTION

Figure 1:
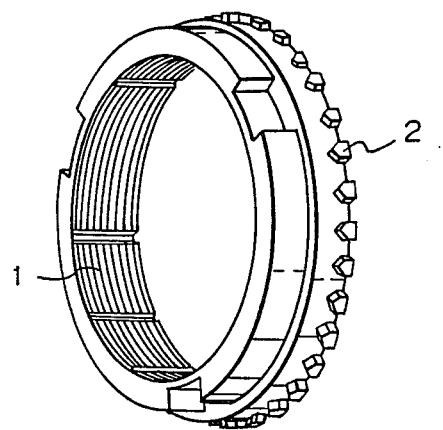
FIG. 1 is a perspective view, of a typical synchronizer ring for use in a speed variator.

The present invention has been accomplished on the basis of the findings described above. The criticality of the composition of each of the two Cu alloys specified above is explained hereinafter:
  (1) Cu alloy of which the first synchronizer ring is made:
    (a) Zn and Al
  These elements, when they are present in combination, are effective in improving the strength and toughness of the alloy. If the Zn content is less than 17% and if the Al content is less than 2%, the desired strength or toughness is not attainable. If the Zn and Al contents exceed 40% and 11%, respectively, no further improvement is attainable. Therefore, the contents of Zn and Al are limited to be within the ranges of 17–40% and 2–11%, respectively.
    (b) Oxygen
  Oxygen ($O_2$) has the ability to combine with Al, Ti, Zr, V and even Si to form oxides that are uniformly dispersed in the matrix, thereby enhancing not only the friction coefficient which serves as an index for synchronizing characteristics with respect to the mating member for the synchronizer ring but also the wear resistance of the alloy. If the oxygen content is less than 50 ppm, the intended effect of oxygen is not attainable. If the oxygen content exceeds 3,000 ppm, the oxides are agglomerated and their amount increases the cause a decrease in strength and toughness. Therefore, the oxygen content is limited to be within the range of 50–3,000 ppm.

(c) Ti, Zr and V

These elements combine with Cu and Al and even Fe, Ni and Co to form intermetallic compounds that are uniformly dispersed in the matrix. They also combine with oxygen to form oxides with Al and Si, thereby improving the synchronizing characteristics with respect to the mating member and ensuring improved wear resistance. If the content of any one of these elements is less than 0.1%, the above-mentioned effects are not attainable. If the content of any one of these elements exceeds 3.5%, the toughness of the alloy is reduced. Therefore, the content of at least one element selected from among Ti, Zr and V is limited to be within the range of 0.1–3.5%

(d) Fe, Ni and Co

These elements serve as components that form intermetallic compounds, thereby increasing the friction coefficient and wear resistance. If the content of any one of these elements is less than 0.02%, the above-mentioned effects are not attainable. If the content of any one of these elements exceeds 3%, the toughness of the alloy is reduced. Therefore, the content of at least one element selected from among Fe, Ni and Co is preferably limited to be within the range of 0.02–3%.

(e) P, Mg and Ca

These elements serve as refining components that reduce the grain size of the intermetallic compounds dispersed in the matrix, thereby improving the strength and toughness of the alloy, as well as its free cutting property. They also are effective in improving the synchronizing characteristics of the synchronizer ring of which the alloy is made, while preventing its adhesion. If the content of any one of these elements is less than 0.003%, the desired effects are not attainable. If the content of any one of these elements exceeds 0.3%, the toughness and wear resistance of the alloy are prone to decrease. Therefore, the content of at least one element selected from among P, Mg and Ca is preferably limited to be within the range of 0.003–0.3%.

(f) Mn

Manganese is also an optional component which may be used to further improve the strength of the alloy and to stabilize its structure against a thermal history. If the content of Mn is less than 0.1%, the desired effects are not attainable. If the Mn content exceeds 4%, an increased amount of oxide slag occurs during the melting of the alloy and the soundness of an ingot made from the molten alloy will be impaired. Therefore, the content of Mn is preferably limited to be within the range of 0.1–4%.

(g) Sn and Si

These elements are also optional components that may be used to strengthen the matrix, thereby improving the wear resistance of the alloy. If the contents of Sn and Si are less than 0.05% and 0.005%, respectively, the intended effect of these elements to provide improved wear resistance is not attainable. If the contents of Sn and Si exceed 2.5% and 0.5%, respectively, the toughness of the alloy will decrease. Therefore, the contents of Sn and Si are preferably limited to be within the ranges of 0.05–2.5% and 0.005–0.5%, respectively.

(h) Pb

Pb, which is another optional element, has the ability to improve the anti-seizure property under high load or friction and to provide an improved cutting property. If the content of Pb is less than 0.05%, the desired effects are not attainable. If the Pb content exceeds 1.5%, the strength and toughness of the alloy will decrease. Therefore, the content of Pb is preferably limited to be within the range of 0.05–1.5%.

(2) Cu alloy of which the second synchronizer ring is made:

(a) Zn and Al

These elements are used for the same reasons as set forth in connection with the first synchronizer ring.

(b) Mn and Si

These elements combine together to form a fine-grained intermetallic compound that is uniformly dispersed in the matrix, thereby improving the strength, toughness and wear resistance of the alloy. Besides attaining these effects, Si forms a double oxide with Al to improve the synchronizing characteristics with respect to the mating member and to enhance the wear resistance of the alloy. If the contents of Mn and Si are less than 0.5% and 0.1%, respectively, the desired effects are not attainable. If the contents of Mn and Si exceed 6% and 2%, respectively, increased slag formation makes casting operations difficult and reduces the toughness of the alloy. Therefore, the contents of Mn and Si are limited to be within the ranges of 0.5–6% and 0.1–2%, respectively.

(c) Fe, Ni and Co

These elements are dispersed in the matrix to refine a Mn-Si based intermetallic compound, thereby improving the strength and toughness of the alloy. They also are effective in improving the wear resistance of the alloy by forming compounds with Si. If the content of any one of these elements is less than 0.1% the desired effects are not attainable. If the content of any one of these elements exceeds 3%, not only the toughness but also the castability of the alloy is reduced. Therefore, the content of at least one element selected from among Fe, Ni and Co is limited to be within the range of 0.1–3%.

(d) P, Mg and Ca

These elements serve as refining components that reduce the grain size of the Mn-Si based intermetallic compound dispersed in the matrix, thereby improving the strength and toughness of the alloy. They also form oxides. In addition, these elements are effective in improving the synchronizing characteristics of the synchronizer ring of which the alloy is made, while preventing its seizure. If the content of any one of these elements is less than 0.003%, the desired effects are not attainable. If the content of any one of these elements exceeds 0.3%, the toughness and wear resistance of the alloy are prone to decrease. Therefore, the content of at least one element selected from among P, Mg and Ca is preferably limited to be within the range of 0.003–0.3%.

(e) Oxygen

Oxygen ($O_2$) has the ability to combine with Al and Si and even Cr to form a double oxide that contributes to improvement in the characteristics described above. If the content of oxygen is less than 30 ppm, the amount of the oxide dispersed in the matrix in the form of fine grains is too small to ensure the desired effect of oxygen to improve these characteristics. Furthermore, the friction coefficient of the alloy becomes instable if the oxygen content is less than 30 ppm. If, on the other hand, the content of oxygen exceeds 1,000 ppm, the oxide forms an aggregate whose content is so high as to decrease the strength and toughness of the alloy. Therefore, the oxygen content is limited to be within the range of 30–1,000 ppm.

(f) Cr

This element is an optional component that may be used to form an intermetallic compound with an iron-group metal. At the same time, it forms an oxide so as to achieve a further improvement in wear resistance and to stabilize the friction coefficient of the alloy. If the content of Cr is less than 0.05%, the desired effects are not attainable. If the Cr content exceeds 1%, the toughness of the alloy is reduced. Therefore, the content of Cr is preferably limited to be within the range of 0.05-1%.

(g) Pb and Sn

These elements are also optional components that may be employed to prevent seizure of a synchronizer ring under high load or friction and to adjust its friction coefficient to an appropriate value. If the content of each of these elements is less than 0.05%, the desired effects are not attainable. If the content of any one of these elements exceeds 2%, the strength and toughness of the alloy are reduced. Therefore, the content of at least one element selected from among Pb and Sn is preferably limited to be within the range of 0.05-2%.

The following examples are provided for the purpose of further illustrating the present invention but are in no way to be taken as limiting.

EXAMPLE 1

Using a conventional high-frequency furnace filled with a mixture of Ar and CO gases, melts having the compositions noted in Table 1 were prepared with the adjustment of $O_2$ content being effected by blowing varying amounts of $O_2$ with the supply of CO gas stopped. The melts were cast in a water-cooled mold to form billets having a diameter of 200 mm and a length of 400 mm. The billets were hot extruded at predetermined temperatures between 600° C. and 750° C. into test sections in round bar form having a predetermined diameter. These test sections were subjected to a heat treatment consisting of holding at predetermined temperatures within the range of 550°-700° C. and cooling with air. By these procedures, sample Nos. 1-189 of Cu alloy for the synchronizer ring of the present invention and comparative sample Nos. 1-27 were prepared.

Comparative sample Nos. 1-27 were outside the scope of the present invention in terms of the content of one or more constituent elements (such elements are marked with an asterisk in Table 1).

In order to evaluate the strength of alloys, sample Nos. 1-189 and comparative sample Nos. 1-27 were subjected to measurements of tensile strength. In order to evaluate the toughness of alloys, all samples were subjected to measurements of Charpy impact strength and elongation. In order to evaluate wear resistance and synchronizing characteristics with respect to a mating member, the samples were also subjected to a pin wear test conducted under the following conditions:

| Specimen: | pin 3 mm in diameter |
|---|---|
| Mating member: | carburized hardening steel (JIS SCM 420 with $H_RC$ of 61.5) |

In the pin wear test, the amount of specific wear was measured and the friction coefficient was calculated from the data obtained with a torque meter. For more specific information of the conditions of the pin wear test, see below. The results of all measurements are summarized in Table 2.

| Parameter | Pin Wear Test | | |
|---|---|---|---|
| | A | B | C |
| Oil | gear oil No. 90 | gear oil No. 75 | gear oil No. 80 |
| Oil temperature | 60° C. | 90° C. | 120° C. |
| Friction speed | 2 m/sec | 3 m/sec | 4 m/sec |
| Pressure | 100 kg/cm$^2$ | 110 kg/cm$^2$ | 120 kg/cm$^2$ |
| Sliding Distance | 1.5 km | 1.5 km | 1.5 km |

The results summarized in Table 2 show that sample Nos. 1-189 of the Cu alloy for use as the material of the synchronizer ring of the present invention are high in both strength and toughness while exhibiting high wear resistance and friction coefficient. On the other hand, comparative sample Nos. 1-27 which are outside the scope of the present invention in terms of the amount of one or more constituent elements are inferior to the samples of the present invention with respect to one or more of the characteristics mentioned above.

TABLE 1

| Sample No. | Composition (wt %) | | | | | | | | | | |
|---|---|---|---|---|---|---|---|---|---|---|---|
| | Zn | Al | O$_2$ (ppm) | Ti | Zr | V | Mn | Sn | Si | Pb | Cu + impurities |
| Cu alloy for the synchronizer ring of the present invention | | | | | | | | | | | |
| 1 | 17.6 | 5.2 | 1350 | 1.76 | — | — | — | — | — | — | bal. |
| 2 | 29.6 | 5.0 | 1420 | 1.80 | — | — | — | — | — | — | bal. |
| 3 | 39.7 | 5.1 | 1430 | 1.75 | — | — | — | — | — | — | bal. |
| 4 | 28.3 | 2.1 | 1370 | 1.76 | — | — | — | — | — | — | bal. |
| 5 | 29.1 | 10.8 | 1540 | 1.79 | — | — | — | — | — | — | bal. |
| 6 | 29.4 | 5.0 | 52 | 1.73 | — | — | — | — | — | — | bal. |
| 7 | 28.6 | 5.1 | 2960 | 1.74 | — | — | — | — | — | — | bal. |
| 8 | 29.1 | 4.9 | 1420 | 0.11 | — | — | — | — | — | — | bal. |
| 9 | 29.4 | 5.2 | 1560 | 3.44 | — | — | — | — | — | — | bal. |
| 10 | 29.0 | 5.3 | 1360 | — | 0.12 | — | — | — | — | — | bal. |
| 11 | 29.1 | 5.5 | 1350 | — | 1.79 | — | — | — | — | — | bal. |
| 12 | 30.1 | 5.0 | 1280 | — | 3.41 | — | — | — | — | — | bal. |
| 13 | 29.5 | 5.2 | 1310 | — | — | 0.13 | — | — | — | — | bal. |
| 14 | 29.5 | 4.8 | 1400 | — | — | 1.43 | — | — | — | — | bal. |
| 15 | 28.6 | 4.6 | 1510 | — | — | 3.24 | — | — | — | — | bal. |
| 16 | 29.6 | 5.1 | 1230 | 0.83 | 0.74 | — | — | — | — | — | bal. |
| 17 | 28.6 | 5.1 | 1410 | 0.54 | 0.42 | 0.94 | — | — | — | — | bal. |
| 18 | 29.4 | 5.5 | 1320 | 1.74 | — | — | 0.11 | — | — | — | bal. |
| 19 | 30.2 | 5.4 | 1410 | 1.77 | — | — | 2.04 | — | — | — | bal. |
| 20 | 29.4 | 5.3 | 1460 | 1.79 | — | — | 3.96 | — | — | — | bal. |
| 21 | 29.8 | 5.0 | 1320 | 1.64 | — | — | — | 0.054 | — | — | bal. |
| 22 | 28.5 | 5.4 | 1340 | 1.71 | — | — | — | 2.46 | — | — | bal. |

TABLE 1-continued

| Sample No. | Zn | Al | O₂ (ppm) | Ti | Zr | V | Fe | Ni | Co | Mn | Sn | Si | Pb | Cu + impurities |
|---|---|---|---|---|---|---|---|---|---|---|---|---|---|---|
| 23 | 29.3 | 5.5 | 1610 | 1.74 | — | — | — | — | — | 0.0053 | — | — | — | bal. |
| 24 | 28.8 | 5.1 | 1380 | 1.64 | — | — | — | — | 0.64 | 0.13 | — | — | — | bal. |
| 25 | 28.6 | 5.1 | 1420 | 1.69 | — | — | — | — | — | — | — | — | 0.052 | bal. |
| 26 | 29.2 | 5.4 | 1310 | 1.74 | — | — | — | — | — | — | — | — | 0.74 | bal. |
| 27 | 29.3 | 5.0 | 1280 | 1.70 | — | — | — | — | — | — | — | — | 1.47 | bal. |
| 28 | 30.1 | 5.4 | 1260 | — | 1.29 | — | 1.03 | 0.84 | — | — | — | — | — | bal. |
| 29 | 30.4 | 5.5 | 1100 | — | — | 0.96 | 2.54 | — | 0.24 | — | — | — | — | bal. |
| 30 | 29.1 | 5.4 | 1230 | — | 0.64 | 0.77 | 0.54 | — | — | — | — | — | 0.32 | bal. |
| 31 | 29.8 | 5.3 | 1190 | 0.54 | 0.64 | 1.29 | — | — | 0.16 | — | — | — | 0.64 | bal. |
| 32 | 30.4 | 5.2 | 1640 | 3.01 | — | 0.33 | — | 0.33 | 0.32 | — | — | — | 0.09 | bal. |
| 33 | 28.6 | 5.4 | 1750 | — | 1.33 | 0.64 | 1.54 | — | 0.20 | — | — | — | 1.04 | bal. |
| 34 | 29.7 | 5.0 | 980 | 0.33 | 0.42 | 0.16 | 0.74 | 0.09 | 0.013 | — | — | — | 0.22 | bal. |
| comparative sample | | | | | | | | | | | | | | |
| 1 | 15.3* | 5.6 | 1250 | 1.76 | — | — | — | — | — | — | — | — | — | bal. |
| 2 | 29.4 | 1.1* | 1480 | 1.73 | — | — | — | — | — | — | — | — | — | bal. |
| 3 | 29.3 | 5.4 | —* | 1.70 | — | — | — | — | — | — | — | — | — | bal. |
| 4 | 30.2 | 5.5 | 3520* | 1.64 | — | — | — | — | — | — | — | — | — | bal. |
| 5 | 28.6 | 5.5 | 1560 | —* | —* | —* | — | — | — | — | — | — | — | bal. |
| 6 | 29.7 | 5.1 | 1380 | — | 2.5* | 2.3* | — | — | — | — | — | — | — | bal. |

| Sample No. | Zn | Al | O₂ (ppm) | Ti | Zr | V | Fe | Ni | Co | Mn | Sn | Si | Pb | Cu + impurities |
|---|---|---|---|---|---|---|---|---|---|---|---|---|---|---|
| Cu alloy for the synchronizer ring of the present invention | | | | | | | | | | | | | | |
| 35 | 17.3 | 5.1 | 1540 | 1.64 | — | — | — | 1.53 | — | — | — | — | — | bal. |
| 36 | 29.6 | 5.0 | 1230 | 1.58 | — | — | — | 1.54 | — | — | — | — | — | bal. |
| 37 | 39.6 | 5.6 | 1610 | 1.60 | — | — | — | 1.64 | — | — | — | — | — | bal. |
| 38 | 28.1 | 2.1 | 1540 | 1.62 | — | — | — | 1.53 | — | — | — | — | — | bal. |
| 39 | 29.0 | 10.8 | 1330 | 1.55 | — | — | — | 1.61 | — | — | — | — | — | bal. |
| 40 | 28.6 | 5.4 | 60 | 1.62 | — | — | — | 1.56 | — | — | — | — | — | bal. |
| 41 | 29.2 | 5.2 | 2970 | 1.66 | — | — | — | 1.60 | — | — | — | — | — | bal. |
| 42 | 28.3 | 5.0 | 1250 | 0.13 | — | — | — | 1.66 | — | — | — | — | — | bal. |
| 43 | 28.7 | 5.1 | 1270 | — | 0.11 | — | — | 1.52 | — | — | — | — | — | bal. |
| 44 | 28.6 | 5.4 | 1100 | — | 1.64 | — | — | 1.64 | — | — | — | — | — | bal. |
| 45 | 28.6 | 5.0 | 1080 | — | 3.47 | — | — | 1.73 | — | — | — | — | — | bal. |
| 46 | 29.4 | 4.8 | 1320 | — | — | 0.14 | — | 1.64 | — | — | — | — | — | bal. |
| 47 | 29.3 | 5.4 | 1410 | — | — | 2.54 | — | 1.78 | — | — | — | — | — | bal. |
| 48 | 29.1 | 5.0 | 1580 | 0.83 | — | 0.64 | — | 1.64 | — | — | — | — | — | bal. |
| 49 | 28.7 | 5.2 | 1340 | 1.53 | — | — | — | 0.021 | — | — | — | — | — | bal. |
| 50 | 29.6 | 5.1 | 1040 | 1.58 | — | — | — | 2.91 | — | — | — | — | — | bal. |
| 51 | 28.1 | 5.2 | 1610 | 1.61 | — | — | 0.16 | — | — | — | — | — | — | bal. |
| 52 | 28.7 | 5.5 | 2310 | 1.56 | — | — | 1.73 | — | — | — | — | — | — | bal. |
| 53 | 29.4 | 4.8 | 1100 | 1.63 | — | — | — | — | 0.11 | — | — | — | — | bal. |
| 54 | 29.3 | 4.9 | 980 | 1.64 | — | — | — | — | 2.68 | — | — | — | — | bal. |
| 55 | 29.4 | 4.9 | 1310 | 1.88 | — | — | 0.54 | 0.64 | 0.32 | — | — | — | — | bal. |
| 56 | 30.4 | 5.4 | 1050 | — | 0.23 | — | 0.04 | — | 0.09 | 0.14 | — | — | — | bal. |
| 57 | 30.2 | 5.1 | 1080 | 1.56 | — | — | — | 1.33 | — | 3.24 | — | — | — | bal. |
| 58 | 28.6 | 5.0 | 1670 | — | 0.18 | — | — | — | 0.03 | — | 0.058 | — | — | bal. |
| 59 | 28.5 | 5.0 | 2100 | — | 0.64 | 0.23 | 2.13 | 0.67 | — | — | 2.13 | — | — | bal. |
| 60 | 30.2 | 4.9 | 980 | 1.54 | — | — | — | 1.04 | — | — | — | 0.08 | — | bal. |
| 61 | 29.8 | 5.4 | 950 | — | — | 1.14 | — | — | 1.39 | — | — | 1.33 | — | bal. |
| 62 | 29.2 | 5.3 | 1200 | 1.53 | — | 0.33 | 1.03 | 0.33 | — | — | — | — | 0.053 | bal. |
| 63 | 30.1 | 4.9 | 1640 | — | 0.96 | — | — | — | 1.42 | — | — | — | 0.96 | bal. |
| 64 | 28.6 | 5.0 | 1920 | 0.66 | — | 0.45 | 0.64 | — | 0.33 | 0.74 | — | 0.04 | — | bal. |
| 65 | 28.7 | 5.1 | 980 | — | — | 1.67 | 0.33 | 0.99 | — | 2.04 | 0.64 | 0.23 | — | bal. |
| 66 | 28.1 | 4.7 | 950 | 0.33 | 0.41 | 0.34 | — | 1.61 | — | 0.33 | — | — | 1.29 | bal. |
| 67 | 29.4 | 5.5 | 1320 | — | 0.55 | 0.84 | — | 1.24 | 1.14 | — | — | 0.0054 | 0.32 | bal. |
| 68 | 29.1 | 5.3 | 2400 | — | 0.66 | — | 1.33 | — | — | — | 1.23 | — | 0.54 | bal. |
| 69 | 29.6 | 5.2 | 2100 | — | 0.24 | 0.64 | 0.44 | — | 0.64 | — | 0.32 | 0.01 | 0.09 | bal. |
| 70 | 29.4 | 5.0 | 870 | 1.54 | — | — | — | 1.04 | — | 1.36 | 1.41 | — | 1.01 | bal. |
| 71 | 28.3 | 5.3 | 1870 | 0.31 | — | 0.87 | 0.94 | 0.66 | — | 0.42 | — | 0.15 | 0.23 | bal. |
| 72 | 28.6 | 5.2 | 1540 | 0.91 | 0.37 | 0.99 | 1.54 | 0.21 | 0.33 | 0.94 | 0.64 | 0.10 | 0.49 | bal. |
| comparative sample | | | | | | | | | | | | | | |
| 7 | 14.6* | 5.1 | 1240 | 1.53 | — | — | — | 1.54 | — | — | — | — | — | bal. |
| 8 | 28.6 | 1.2* | 1530 | 1.61 | — | — | — | 1.64 | — | — | — | — | — | bal. |
| 9 | 28.3 | 5.0 | 20* | 1.70 | — | — | — | — | 0.93 | — | — | — | — | bal. |
| 10 | 29.1 | 5.3 | 3700* | 1.62 | — | — | — | 1.52 | — | — | — | — | — | bal. |
| 11 | 28.6 | 5.2 | 1420 | —* | —* | —* | —* | —* | —* | — | — | — | — | bal. |
| 12 | 28.4 | 5.1 | 1310 | — | 4.63* | — | — | 1.74 | — | — | — | — | — | bal. |
| 13 | 28.7 | 5.0 | 1610 | 1.67 | — | — | — | 3.68* | — | — | — | — | — | bal. |

| Sample No. | Zn | Al | O₂ (ppm) | Ti | Zr | V | P | Mg | Ca | Mn | Sn | Si | Pb | Cu + impurities |
|---|---|---|---|---|---|---|---|---|---|---|---|---|---|---|
| Cu alloy for the synchronizer ring of the present invention | | | | | | | | | | | | | | |
| 73 | 17.2 | 4.7 | 1260 | 1.75 | — | — | 0.12 | — | — | — | — | — | — | bal. |
| 74 | 28.6 | 4.8 | 1310 | 1.68 | — | — | 0.11 | — | — | — | — | — | — | bal. |
| 75 | 39.8 | 4.6 | 1280 | 1.72 | — | — | 0.11 | — | — | — | — | — | — | bal. |
| 76 | 28.3 | 2.1 | 1160 | 1.73 | — | — | 0.13 | — | — | — | — | — | — | bal. |

TABLE 1-continued

| Sample No. | Zn | Al | O₂ (ppm) | Ti | Zr | V | Fe | Ni | Co | P | Mg | Ca | Mn | Sn | Si | Pb | Cu + impurities |
|---|---|---|---|---|---|---|---|---|---|---|---|---|---|---|---|---|---|
| 77 | 28.5 | 10.9 | 1670 | 1.69 | — | — | 0.09 | — | — | — | — | — | — | — | — | — | bal. |
| 78 | 29.0 | 4.6 | 51 | 1.70 | — | — | 0.08 | — | — | — | — | — | — | — | — | — | bal. |
| 79 | 28.7 | 5.0 | 2980 | 1.65 | — | — | 0.11 | — | — | — | — | — | — | — | — | — | bal. |
| 80 | 29.1 | 4.8 | 1350 | 0.12 | — | — | 0.10 | — | — | — | — | — | — | — | — | — | bal. |
| 81 | 29.6 | 5.0 | 1630 | 3.47 | — | — | 0.09 | — | — | — | — | — | — | — | — | — | bal. |
| 82 | 29.5 | 4.8 | 1210 | — | 0.11 | — | 0.12 | — | — | — | — | — | — | — | — | — | bal. |
| 83 | 30.3 | 4.7 | 1320 | — | 1.80 | — | 0.11 | — | — | — | — | — | — | — | — | — | bal. |
| 84 | 30.6 | 4.5 | 1870 | — | 3.43 | — | 0.13 | — | — | — | — | — | — | — | — | — | bal. |
| 85 | 29.8 | 4.9 | 1150 | — | — | 0.11 | 0.11 | — | — | — | — | — | — | — | — | — | bal. |
| 86 | 30.6 | 4.5 | 1460 | — | — | 1.67 | 0.09 | — | — | — | — | — | — | — | — | — | bal. |
| 87 | 30.7 | 4.7 | 1980 | — | — | 3.43 | 0.08 | — | — | — | — | — | — | — | — | — | bal. |
| 88 | 30.3 | 4.8 | 1530 | 0.74 | 0.69 | — | 0.11 | — | — | — | — | — | — | — | — | — | bal. |
| 89 | 29.8 | 5.1 | 1340 | — | 2.04 | 0.50 | 0.10 | — | — | — | — | — | — | — | — | — | bal. |
| 90 | 29.7 | 4.9 | 1250 | 0.32 | — | 2.32 | 0.09 | — | — | — | — | — | — | — | — | — | bal. |
| 91 | 30.1 | 4.7 | 1220 | 0.91 | 0.96 | 0.97 | 0.10 | — | — | — | — | — | — | — | — | — | bal. |
| 92 | 30.3 | 4.8 | 1310 | 1.68 | — | — | 0.0031 | — | — | — | — | — | — | — | — | — | bal. |
| 93 | 29.6 | 5.3 | 1340 | 1.73 | — | — | 0.29 | — | — | — | — | — | — | — | — | — | bal. |
| 94 | 29.4 | 5.1 | 1280 | 1.72 | — | — | — | 0.0033 | — | — | — | — | — | — | — | — | bal. |
| 95 | 29.6 | 4.8 | 1260 | 1.69 | — | — | — | 0.16 | — | — | — | — | — | — | — | — | bal. |
| 96 | 30.1 | 4.6 | 1300 | 1.70 | — | — | — | 0.29 | — | — | — | — | — | — | — | — | bal. |
| 97 | 30.8 | 4.5 | 1290 | 1.67 | — | — | — | — | 0.0032 | — | — | — | — | — | — | — | bal. |
| 98 | 29.8 | 4.8 | 1160 | 1.68 | — | — | — | — | 0.14 | — | — | — | — | — | — | — | bal. |
| 99 | 30.3 | 4.6 | 1140 | 1.71 | — | — | — | — | 0.27 | — | — | — | — | — | — | — | bal. |
| 100 | 31.0 | 4.2 | 1170 | 1.69 | — | — | 0.03 | 0.01 | — | — | — | — | — | — | — | — | bal. |
| 101 | 29.8 | 4.6 | 1300 | 1.65 | — | — | — | 0.10 | 0.02 | — | — | — | — | — | — | — | bal. |
| 102 | 30.3 | 4.7 | 1250 | 1.67 | — | — | 0.13 | — | 0.09 | — | — | — | — | — | — | — | bal. |
| 103 | 29.7 | 4.9 | 1360 | 1.71 | — | — | 0.04 | 0.05 | 0.01 | — | — | — | — | — | — | — | bal. |
| 104 | 28.6 | 5.0 | 1420 | 1.61 | — | — | 0.09 | — | — | 0.11 | — | — | — | — | — | — | bal. |
| 105 | 29.4 | 4.8 | 1180 | 1.58 | — | — | 0.11 | — | — | 2.0 | — | — | — | — | — | — | bal. |
| 106 | 30.1 | 4.6 | 1400 | 1.56 | — | — | 0.10 | — | — | 3.9 | — | — | — | — | — | — | bal. |
| 107 | 29.8 | 4.7 | 1270 | 1.60 | — | — | 0.12 | — | — | — | 0.052 | — | — | — | — | — | bal. |
| 108 | 30.3 | 4.5 | 1320 | 1.59 | — | — | 0.08 | — | — | — | — | 0.0051 | — | — | — | — | bal. |
| 109 | 29.7 | 4.8 | 1410 | 1.71 | — | — | 0.10 | — | — | — | 1.23 | 0.47 | — | — | — | — | bal. |
| 110 | 29.5 | 5.0 | 1440 | 1.68 | — | — | 0.09 | — | — | — | — | — | — | — | — | 0.052 | bal. |
| 111 | 29.4 | 4.9 | 1500 | 1.67 | — | — | 0.11 | — | — | — | — | — | — | — | — | 0.74 | bal. |
| 112 | 30.1 | 4.7 | 1260 | 1.64 | — | — | 0.10 | — | — | — | — | — | — | — | — | 1.46 | bal. |
| 113 | 29.6 | 4.8 | 1320 | 0.83 | — | 0.71 | 0.06 | — | 0.04 | 0.7 | 0.54 | — | — | — | — | — | bal. |
| 114 | 29.7 | 4.8 | 1340 | — | 1.23 | — | — | — | 0.11 | 1.3 | — | 0.24 | — | — | — | — | bal. |
| 115 | 28.6 | 4.9 | 1280 | — | 0.64 | 0.33 | — | 0.11 | — | 2.4 | 2.33 | 0.11 | — | — | — | — | bal. |
| 116 | 30.2 | 4.6 | 1220 | — | — | 1.54 | 0.26 | — | — | 0.14 | — | — | — | 1.04 | — | — | bal. |
| 117 | 30.4 | 4.5 | 1200 | — | 0.33 | — | — | — | 0.06 | 0.54 | — | — | — | 0.09 | — | — | bal. |
| 118 | 29.8 | 4.8 | 1240 | 1.03 | — | 0.32 | 0.03 | 0.04 | 0.01 | 1.56 | — | — | — | 0.07 | — | — | bal. |
| 119 | 30.3 | 4.6 | 1300 | 1.64 | — | — | 0.13 | — | — | — | — | — | 0.07 | — | 0.07 | — | bal. |
| 120 | 30.2 | 4.7 | 1280 | — | 3.46 | — | — | 0.11 | — | — | — | — | 0.008 | 0.32 | — | — | bal. |
| 121 | 30.2 | 4.6 | 1270 | 0.64 | 0.54 | 0.68 | — | 0.06 | 0.005 | — | 1.64 | 0.25 | 0.88 | — | — | — | bal. |
| 122 | 29.6 | 4.9 | 1190 | 0.91 | 0.44 | — | — | 0.14 | — | 0.21 | 0.32 | — | 0.64 | — | — | — | bal. |
| 123 | 29.4 | 5.0 | 1270 | 0.03 | 0.04 | 0.08 | 0.08 | 0.07 | — | 1.44 | — | 0.36 | 0.07 | — | — | — | bal. |
| 124 | 28.6 | 5.3 | 1300 | 0.91 | 0.95 | 0.26 | 0.001 | 0.003 | 0.007 | 3.11 | 0.91 | 0.16 | 1.22 | — | — | — | bal. |
| comparative sample | | | | | | | | | | | | | | | | | |
| 14 | 15.6* | 5.5 | 1290 | 1.63 | — | — | 0.11 | — | — | — | — | — | — | — | — | — | bal. |
| 15 | 29.6 | 1.3* | 1310 | 1.59 | — | — | 0.09 | — | — | — | — | — | — | — | — | — | bal. |
| 16 | 30.0 | 4.9 | —* | 1.62 | — | — | 0.10 | — | — | — | — | — | — | — | — | — | bal. |
| 17 | 30.5 | 4.7 | 3150* | 1.56 | — | — | 0.14 | — | — | — | — | — | — | — | — | — | bal. |
| 18 | 29.6 | 4.5 | 1360 | —* | —* | —* | 0.09 | — | — | — | — | — | — | — | — | — | bal. |
| 19 | 29.4 | 5.0 | 1210 | 4.21* | — | — | 0.11 | — | — | — | — | — | — | — | — | — | bal. |
| 20 | 29.6 | 4.9 | 1210 | 1.49 | — | — | — | — | — | 0.43* | — | — | — | — | — | — | bal. |
| Cu alloy for the synchronizer ring of the present invention | | | | | | | | | | | | | | | | | |
| 125 | 17.3 | 5.1 | 1480 | 1.63 | — | — | — | 1.62 | — | 0.13 | — | — | — | — | — | — | bal. |
| 126 | 27.1 | 5.4 | 1260 | 1.65 | — | — | — | 1.59 | — | 0.11 | — | — | — | — | — | — | bal. |
| 127 | 39.6 | 5.6 | 1340 | 1.58 | — | — | — | 1.71 | — | 0.12 | — | — | — | — | — | — | bal. |
| 128 | 29.4 | 2.1 | 1550 | 1.62 | — | — | — | 1.58 | — | 0.13 | — | — | — | — | — | — | bal. |
| 129 | 28.6 | 10.9 | 1470 | 1.58 | — | — | — | 1.61 | — | 0.13 | — | — | — | — | — | — | bal. |
| 130 | 29.0 | 5.2 | 60 | 1.59 | — | — | — | 1.70 | — | 0.15 | — | — | — | — | — | — | bal. |
| 131 | 29.3 | 5.4 | 2970 | 1.56 | — | — | — | 1.58 | — | 0.14 | — | — | — | — | — | — | bal. |
| 132 | 29.5 | 5.1 | 1430 | 0.11 | — | — | — | 1.65 | — | 0.14 | — | — | — | — | — | — | bal. |
| 133 | 28.9 | 5.8 | 1210 | 3.46 | — | — | — | 1.59 | — | 0.12 | — | — | — | — | — | — | bal. |
| 134 | 30.1 | 5.4 | 1150 | — | 0.12 | — | — | 1.72 | — | 0.15 | — | — | — | — | — | — | bal. |
| 135 | 29.8 | 5.5 | 1280 | — | 1.81 | — | — | 1.68 | — | 0.14 | — | — | — | — | — | — | bal. |
| 136 | 29.6 | 5.4 | 1530 | — | 3.46 | — | — | 1.69 | — | 0.13 | — | — | — | — | — | — | bal. |
| 137 | 30.5 | 5.2 | 1160 | — | — | 0.13 | — | 1.68 | — | 0.12 | — | — | — | — | — | — | bal. |
| 138 | 30.7 | 4.9 | 1210 | — | — | 1.69 | — | 1.71 | — | 0.13 | — | — | — | — | — | — | bal. |
| 139 | 30.2 | 5.1 | 1190 | — | — | 3.42 | — | 1.59 | — | 0.13 | — | — | — | — | — | — | bal. |
| 140 | 29.7 | 5.2 | 1470 | 0.86 | 0.72 | — | — | 1.67 | — | 0.12 | — | — | — | — | — | — | bal. |
| 141 | 29.9 | 5.3 | 1320 | — | 0.24 | 0.16 | — | 1.81 | — | 0.11 | — | — | — | — | — | — | bal. |
| 142 | 30.0 | 5.1 | 1690 | 0.32 | — | 0.96 | — | 1.58 | — | 0.15 | — | — | — | — | — | — | bal. |
| 143 | 29.8 | 5.2 | 1590 | 0.91 | 0.84 | 0.74 | — | 1.66 | — | 0.14 | — | — | — | — | — | — | bal. |

TABLE 1-continued

| Sample No. | | | | | | | | | | | | | | | | | |
|---|---|---|---|---|---|---|---|---|---|---|---|---|---|---|---|---|---|
| 144 | 29.7 | 5.4 | 1400 | 1.56 | — | — | — | 0.021 | — | 0.14 | — | — | — | — | — | — | bal. |
| 145 | 30.6 | 5.3 | 1390 | 1.48 | — | — | — | 2.96 | — | 0.15 | — | — | — | — | — | — | bal. |
| 146 | 30.3 | 5.3 | 1520 | 1.65 | — | — | 0.022 | — | — | 0.13 | — | — | — | — | — | — | bal. |
| 147 | 29.6 | 5.1 | 1490 | 1.58 | — | — | 1.53 | — | — | 0.14 | — | — | — | — | — | — | bal. |
| 148 | 29.7 | 5.2 | 1520 | 1.59 | — | — | 2.96 | — | — | 0.13 | — | — | — | — | — | — | bal. |
| 149 | 30.3 | 5.0 | 1440 | 1.62 | — | — | — | — | 0.021 | 0.13 | — | — | — | — | — | — | bal. |
| 150 | 29.5 | 4.9 | 1210 | 1.58 | — | — | — | — | 1.66 | 0.11 | — | — | — | — | — | — | bal. |
| 151 | 29.8 | 5.0 | 1150 | 1.49 | — | — | — | — | 2.94 | 0.13 | — | — | — | — | — | — | bal. |
| 152 | 29.6 | 5.2 | 1210 | 1.52 | — | — | 1.03 | 0.54 | — | 0.12 | — | — | — | — | — | — | bal. |
| 153 | 30.1 | 5.1 | 1410 | 1.48 | — | — | — | 1.13 | 0.57 | 0.15 | — | — | — | — | — | — | bal. |
| 154 | 30.3 | 5.2 | 1510 | 1.62 | — | — | 0.43 | — | 1.05 | 0.13 | — | — | — | — | — | — | bal. |
| 155 | 29.7 | 5.1 | 1480 | 1.45 | — | — | 0.43 | 0.32 | 0.64 | 0.14 | — | — | — | — | — | — | bal. |
| 156 | 29.4 | 5.7 | 1310 | 1.37 | — | — | — | 1.58 | — | 0.0031 | — | — | — | — | — | — | bal. |
| 157 | 29.8 | 5.4 | 1360 | 1.54 | — | — | — | 1.62 | — | 0.28 | — | — | — | — | — | — | bal. |
| 158 | 30.1 | 4.9 | 1280 | 1.62 | — | — | — | 1.66 | — | — | 0.0033 | — | — | — | — | — | bal. |
| 159 | 28.7 | 5.9 | 1400 | 1.65 | — | — | — | 1.58 | — | — | 0.16 | — | — | — | — | — | bal. |
| 160 | 29.1 | 6.1 | 1190 | 1.68 | — | — | — | 1.71 | — | — | 0.29 | — | — | — | — | — | bal. |
| 161 | 30.4 | 5.4 | 1310 | 1.69 | — | — | — | 1.63 | — | — | — | 0.0031 | — | — | — | — | bal. |
| 162 | 29.6 | 5.6 | 1420 | 1.66 | — | — | — | 1.73 | — | — | — | 0.11 | — | — | — | — | bal. |
| 163 | 29.8 | 5.4 | 1320 | 1.59 | — | — | — | 1.65 | — | — | — | 0.24 | — | — | — | — | bal. |
| 164 | 29.7 | 5.5 | 1190 | 1.64 | — | — | — | 1.59 | — | 0.06 | 0.04 | 0.04 | — | — | — | — | bal. |
| 165 | 30.0 | 5.3 | 1220 | 1.68 | — | — | — | 1.62 | — | — | 0.01 | 0.03 | — | — | — | — | bal. |
| 166 | 29.4 | 5.4 | 1310 | 1.59 | — | — | — | 1.65 | — | 0.002 | — | 0.04 | — | — | — | — | bal. |
| 167 | 30.1 | 5.3 | 1280 | 1.64 | — | — | — | 1.71 | — | 0.03 | 0.04 | 0.04 | — | — | — | — | bal. |
| 168 | 28.9 | 5.6 | 1320 | 1.62 | — | — | — | 1.70 | — | 0.12 | — | — | 0.13 | — | — | — | bal. |
| 169 | 30.0 | 5.3 | 1360 | 1.63 | — | — | — | 1.63 | — | 0.13 | — | — | 1.9 | — | — | — | bal. |
| 170 | 29.8 | 5.4 | 1420 | 1.59 | — | — | — | 1.63 | — | 0.15 | — | — | 3.9 | — | — | — | bal. |
| 171 | 30.1 | 5.7 | 1380 | 1.65 | — | — | — | 1.59 | — | 0.14 | — | — | — | 0.052 | — | — | bal. |
| 172 | 29.4 | 5.6 | 1390 | 1.49 | — | — | — | 1.71 | — | 0.13 | — | — | — | 2.43 | — | — | bal. |
| 173 | 29.1 | 5.4 | 1520 | 1.58 | — | — | — | 1.68 | — | 0.14 | — | — | — | — | 0.0052 | — | bal. |
| 174 | 29.5 | 5.6 | 1510 | 1.60 | — | — | — | 1.69 | — | 0.14 | — | — | — | 0.64 | 0.36 | — | bal. |
| 175 | 29.3 | 5.4 | 1310 | 1.70 | — | — | — | 1.66 | — | 0.15 | — | — | — | — | — | 0.052 | bal. |
| 176 | 29.4 | 5.5 | 1590 | 1.58 | — | — | — | 1.70 | — | 0.12 | — | — | — | — | — | 0.78 | bal. |
| 177 | 29.6 | 5.5 | 1280 | 1.64 | — | — | — | 1.68 | — | 0.13 | — | — | — | — | — | 1.46 | bal. |
| 178 | 29.7 | 5.4 | 1310 | — | 1.24 | — | 1.54 | — | — | — | 0.18 | — | 0.71 | 1.24 | — | — | bal. |
| 179 | 29.1 | 5.7 | 1480 | 0.54 | — | 0.93 | 1.03 | — | 0.64 | — | — | 0.005 | 0.16 | — | 0.07 | — | bal. |
| 180 | 30.1 | 5.4 | 1390 | 1.15 | 0.50 | — | — | 0.32 | 1.04 | 0.08 | 0.04 | — | 1.20 | 0.32 | 0.41 | — | bal. |
| 181 | 31.0 | 5.0 | 1520 | 0.03 | 0.04 | 0.06 | 0.02 | — | 0.02 | — | 0.002 | 0.002 | — | 0.09 | — | 0.32 | bal. |
| 182 | 29.1 | 5.7 | 1480 | — | — | 1.41 | — | 2.43 | — | — | — | 0.26 | — | — | 0.007 | 0.88 | bal. |
| 183 | 28.9 | 6.0 | 1360 | 0.25 | — | — | — | 0.09 | — | 0.04 | 0.06 | 0.05 | — | 0.06 | 0.03 | 0.09 | bal. |
| 184 | 29.2 | 5.4 | 1410 | 0.96 | 0.87 | 0.66 | 0.54 | 0.52 | 0.55 | 0.21 | 0.03 | 0.01 | 3.2 | — | — | 1.13 | bal. |
| 185 | 29.4 | 5.6 | 1310 | 1.64 | — | — | — | 1.76 | — | 0.13 | — | — | 0.72 | — | — | 0.12 | bal. |
| 186 | 29.3 | 5.4 | 1420 | 0.54 | 0.13 | 0.11 | 0.33 | 0.20 | — | — | 0.06 | 0.03 | 2.10 | — | — | 0.94 | bal. |
| 187 | 29.6 | 5.5 | 1290 | 1.01 | 0.98 | 0.89 | 0.64 | 0.50 | 0.51 | 0.03 | 0.03 | 0.05 | 1.13 | 1.21 | 0.10 | 0.12 | bal. |
| 188 | 29.4 | 5.3 | 1320 | 0.05 | 0.04 | 0.08 | 0.02 | 0.01 | 0.01 | 0.001 | 0.006 | 0.001 | 0.21 | 0.06 | 0.01 | 0.07 | bal. |
| 189 | 29.1 | 5.4 | 1390 | 0.33 | 0.40 | 0.36 | — | 0.96 | 0.84 | 0.003 | 0.004 | 0.001 | 3.20 | 2.23 | 0.36 | 1.12 | bal. |
| comparative sample | | | | | | | | | | | | | | | | | |
| 21 | 15.1* | 5.7 | 1280 | 1.63 | — | — | — | 1.71 | — | 0.13 | — | — | — | — | — | — | bal. |
| 22 | 30.1 | 1.3* | 1410 | 1.59 | — | — | — | 1.65 | — | 0.13 | — | — | — | — | — | — | bal. |
| 23 | 29.8 | 5.6 | 25* | 1.66 | — | — | — | 1.63 | — | 0.15 | — | — | — | — | — | — | bal. |
| 24 | 29.5 | 5.8 | 3450* | 1.58 | — | — | — | 1.64 | — | 0.12 | — | — | — | — | — | — | bal. |
| 25 | 29.4 | 5.4 | 1380 | —* | —* | —* | — | 1.68 | — | 0.13 | — | — | — | — | — | — | bal. |
| 26 | 29.8 | 4.9 | 1290 | — | — | 4.32* | — | 1.59 | — | 0.15 | — | — | — | — | — | — | bal. |
| 27 | 29.6 | 5.6 | 1220 | 1.56 | — | — | — | 1.66 | — | — | — | 0.42* | — | — | — | — | bal. |

TABLE 2

| | Sample No. | TENSILE strength (kg/mm$^2$) | Elongation (%) | Charpy impact strength (kg-m/cm$^2$) | Amount of specific wear ($1 \times 10^{-7}$ mm$^2$/kg-m) | Friction coefficient | Condition of wear test |
|---|---|---|---|---|---|---|---|
| | 1 | 69 | 19.5 | 2.4 | 24 | 0.105 | |
| | 2 | 82 | 18.0 | 2.1 | 20 | 0.110 | |
| | 3 | 89 | 15.0 | 1.9 | 15 | 0.120 | |
| | 4 | 72 | 16.5 | 1.9 | 22 | 0.105 | |
| | 5 | 94 | 10.0 | 1.0 | 18 | 0.125 | |
| Cu alloy | 6 | 82 | 16.5 | 2.5 | 32 | 0.100 | |
| for the | 7 | 72 | 13.5 | 2.0 | 9 | 0.135 | |
| synchro- | 8 | 82 | 16.5 | 2.1 | 30 | 0.090 | A |
| nizer ring | 9 | 76 | 12.0 | 1.4 | 10 | 0.135 | |
| of the | 10 | 81 | 16.5 | 2.0 | 30 | 0.100 | |
| present | 11 | 80 | 16.5 | 1.9 | 13 | 0.130 | |
| invention | 12 | 77 | 12.5 | 1.3 | 9 | 0.135 | |
| | 13 | 81 | 16.5 | 1.9 | 30 | 0.095 | |
| | 14 | 82 | 17.0 | 2.0 | 16 | 0.120 | |
| | 15 | 76 | 12.0 | 1.1 | 8 | 0.135 | |
| | 16 | 83 | 17.0 | 1.9 | 20 | 0.115 | |
| | 17 | 82 | 16.5 | 2.1 | 19 | 0.115 | |
| | 18 | 86 | 17.0 | 1.9 | 18 | 0.110 | |
| | 19 | 88 | 17.0 | 2.0 | 17 | 0.120 | |
| | 20 | 86 | 17.0 | 1.9 | 11 | 0.125 | |
| Cu alloy | 21 | 85 | 17.0 | 1.8 | 19 | 0.115 | |

TABLE 2-continued

| Sample No. | | TENSILE strength (kg/mm²) | Elongation (%) | Charpy impact strength (kg-m/cm²) | Amount of specific wear (1 × 10⁻⁷ mm²/kg-m) | Friction coefficient | Condition of wear test |
|---|---|---|---|---|---|---|---|
| for the | 22 | 83 | 15.0 | 1.6 | 14 | 0.115 | |
| syncro- | 23 | 83 | 19.0 | 2.2 | 22 | 0110 | A |
| nizer ring | 24 | 84 | 16.0 | 1.7 | 17 | 0.115 | |
| of the | 25 | 79 | 15.5 | 1.6 | 17 | 0.120 | |
| present | 26 | 76 | 14.5 | 1.5 | 13 | 0.125 | |
| invention | 27 | 74 | 13.0 | 1.4 | 10 | 0.130 | |
| | 28 | 85 | 14.5 | 1.5 | 13 | 0.115 | |
| | 29 | 88 | 16.5 | 1.9 | 18 | 0.120 | |
| | 30 | 85 | 12.5 | 1.4 | 11 | 0.130 | |
| Cu alloy | 31 | 78 | 14.5 | 1.8 | 17 | 0.130 | |
| for the | 32 | 81 | 16.5 | 1.9 | 18 | 0.120 | A |
| synchro- | 33 | 82 | 15.5 | 1.8 | 16 | 0.130 | |
| nizer ring | 34 | 79 | 16.5 | 2.2 | 21 | 0.115 | |
| of the present invention | | | | | | | |
| | 1 | 60 | 9.5 | 1.5 | 28 | 0.095 | |
| | 2 | 59 | 8.5 | 1.3 | 32 | 0.100 | |
| compara- | 3 | 87 | 19.0 | 2.4 | 28 | 0.095 | A |
| tive | 4 | 65 | 9.5 | 0.9 | 16 | 0.135 | |
| sample | 5 | 80 | 18.0 | 2.3 | 48 | 0.090 | |
| | 6 | 65 | 8.5 | 1.1 | 10 | 0.130 | |
| cu alloy | 35 | 71 | 19.0 | 2.4 | 19 | 0.115 | |
| for the | 36 | 84 | 18.0 | 2.0 | 17 | 0.120 | |
| synchro- | 37 | 89 | 15.0 | 1.7 | 13 | 0.125 | A |
| nizer ring | 38 | 72 | 17.5 | 2.0 | 20 | 0.105 | |
| of the | 39 | 94 | 9.5 | 0.9 | 11 | 0.130 | |
| present | 40 | 81 | 16.5 | 2.4 | 27 | 0.110 | |
| invention | | | | | | | |
| | 41 | 72 | 13.0 | 2.0 | 7 | 0.140 | |
| | 42 | 82 | 16.5 | 2.0 | 27 | 0.095 | |
| | 43 | 82 | 15.5 | 2.0 | 26 | 0.100 | |
| | 44 | 80 | 16.5 | 1.9 | 10 | 0.130 | |
| | 45 | 77 | 12.0 | 1.2 | 6 | 0.140 | |
| | 46 | 81 | 16.0 | 2.0 | 27 | 0.100 | |
| Cu alloy | 47 | 80 | 16.5 | 1.9 | 9 | 0.135 | |
| for the | 48 | 83 | 17.5 | 2.2 | 17 | 0.115 | A |
| synchro- | 49 | 85 | 18.0 | 2.2 | 20 | 0.110 | |
| nizer ring | 50 | 82 | 16.0 | 1.7 | 10 | 0.120 | |
| of the | 51 | 84 | 18.0 | 2.2 | 19 | 0.110 | |
| present | 52 | 80 | 14.5 | 1.6 | 7 | 0.120 | |
| invention | 53 | 86 | 18.0 | 2.2 | 19 | 0.110 | |
| | 54 | 79 | 14.0 | 1.5 | 6 | 0.120 | |
| | 55 | 84 | 18.0 | 1.9 | 16 | 0.120 | |
| | 56 | 84 | 16.5 | 2.0 | 15 | 0.115 | |
| | 57 | 90 | 16.5 | 1.8 | 12 | 0.130 | |
| | 58 | 83 | 17.5 | 2.2 | 30 | 0.095 | |
| | 59 | 82 | 14.5 | 1.7 | 12 | 0.120 | |
| | 60 | 82 | 19.0 | 2.2 | 18 | 0.120 | |
| | 61 | 83 | 18.5 | 2.1 | 17 | 0.120 | |
| | 62 | 84 | 15.0 | 1.3 | 9 | 0.120 | |
| Cu alloy | 63 | 76 | 14.5 | 1.5 | 8 | 0.135 | |
| for the | 64 | 87 | 17.0 | 1.9 | 13 | 0.130 | A |
| synchro- | 65 | 85 | 14.5 | 1.5 | 9 | 0.125 | |
| nizer ring | 66 | 74 | 14.0 | 1.4 | 10 | 0.145 | |
| of the | 67 | 76 | 14.5 | 1.5 | 8 | 0.135 | |
| present | 68 | 83 | 16.0 | 1.9 | 24 | 0.110 | |
| invention | 69 | 80 | 16.0 | 1.9 | 14 | 0.130 | |
| | 70 | 72 | 13.5 | 1.3 | 8 | 0.135 | |
| | 71 | 82 | 14.5 | 1.6 | 14 | 0.125 | |
| | 72 | 85 | 12.5 | 1.2 | 5 | 0.130 | |
| | 7 | 61 | 9.0 | 1.4 | 26 | 0.100 | |
| | 8 | 58 | 8.5 | 1.3 | 31 | 0.105 | |
| | 9 | 86 | 18.5 | 2.3 | 27 | 0.100 | |
| compara- | 10 | 66 | 9.0 | 1.0 | 14 | 0.140 | A |
| tive | 11 | 79 | 18.5 | 2.2 | 46 | 0.090 | |
| sample | 12 | 66 | 8.0 | 1.0 | 8 | 0.130 | |
| | 13 | 82 | 7.5 | 0.9 | 11 | 0.120 | |
| | 73 | 70 | 20.0 | 2.3 | 21 | 0.110 | |
| Cu alloy | 74 | 84 | 18.0 | 2.2 | 19 | 0.115 | |
| for the | 75 | 90 | 15.5 | 1.8 | 14 | 0.125 | |
| synchro- | 76 | 75 | 18.0 | 2.2 | 21 | 0.110 | |
| nizer ring | 77 | 95 | 10.5 | 1.2 | 17 | 0.130 | B |
| of the | 78 | 84 | 16.5 | 2.4 | 31 | 0.105 | |
| present | 79 | 75 | 14.0 | 2.1 | 8 | 0.140 | |
| invention | 80 | 84 | 16.0 | 2.1 | 29 | 0.095 | |
| | 81 | 77 | 12.0 | 1.5 | 9 | 0.135 | |
| | 82 | 85 | 16.5 | 2.2 | 29 | 0.090 | |
| | 83 | 82 | 16.0 | 2.1 | 18 | 0.125 | |

TABLE 2-continued

| Sample No. | | TENSILE strength (kg/mm²) | Elongation (%) | Charpy impact strength (kg-m/cm²) | Amount of specific wear (1 × 10⁻⁷ mm²/kg-m) | Friction coefficient | Condition of wear test |
|---|---|---|---|---|---|---|---|
| | 84 | 79 | 12.5 | 1.4 | 8 | 0.140 | |
| Cu alloy | 85 | 82 | 16.5 | 2.0 | 28 | 0.095 | |
| for the | 86 | 84 | 18.0 | 2.1 | 15 | 0.125 | |
| synchro- | 87 | 78 | 12.5 | 1.2 | 8 | 0.140 | |
| nizer ring | 88 | 84 | 17.0 | 1.9 | 19 | 0.120 | |
| of the | 89 | 81 | 14.5 | 2.0 | 15 | 0.130 | B |
| present | 90 | 79 | 15.0 | 1.9 | 11 | 0.135 | |
| invention | 91 | 78 | 14.5 | 1.8 | 9 | 0.140 | |
| | 92 | 81 | 16.0 | 2.1 | 19 | 0.105 | |
| | 93 | 87 | 16.5 | 2.2 | 20 | 0.120 | |
| | 94 | 80 | 16.5 | 2.0 | 20 | 0.105 | |
| | 95 | 84 | 17.0 | 2.1 | 18 | 0.110 | |
| | 96 | 88 | 16.5 | 2.1 | 19 | 0.125 | |
| | 97 | 80 | 16.5 | 2.1 | 19 | 0.110 | |
| | 98 | 83 | 17.0 | 2.0 | 17 | 0.115 | |
| | 99 | 87 | 16.0 | 2.0 | 18 | 0.125 | |
| | 100 | 81 | 17.5 | 2.1 | 17 | 0.110 | |
| | 101 | 83 | 18.0 | 2.0 | 18 | 0.115 | |
| Cu alloy | 102 | 85 | 17.5 | 1.9 | 20 | 0.120 | |
| for the | 103 | 83 | 16.5 | 2.1 | 17 | 0.115 | |
| synchro- | 104 | 87 | 17.5 | 2.1 | 17 | 0.115 | |
| nizer ring | 105 | 88 | 17.5 | 2.1 | 16 | 0.125 | B |
| of the | 106 | 86 | 17.0 | 2.0 | 10 | 0.130 | |
| present | 107 | 86 | 17.5 | 1.9 | 18 | 0.120 | |
| invention | 108 | 85 | 18.5 | 2.1 | 21 | 0.115 | |
| | 109 | 85 | 16.5 | 1.8 | 16 | 0.120 | |
| | 110 | 80 | 15.5 | 1.7 | 16 | 0.125 | |
| | 111 | 77 | 14.5 | 1.6 | 12 | 0.130 | |
| | 112 | 72 | 12.5 | 1.4 | 9 | 0.135 | |
| | 113 | 83 | 15.5 | 1.9 | 15 | 0.115 | |
| | 114 | 85 | 17.0 | 2.0 | 14 | 0.125 | |
| | 115 | 86 | 17.5 | 2.0 | 9 | 0.130 | |
| Cu alloy | 116 | 75 | 14.0 | 1.5 | 10 | 0.135 | |
| for the | 117 | 85 | 17.0 | 2.1 | 26 | 0.105 | |
| synchro- | 118 | 83 | 17.0 | 1.9 | 13 | 0.125 | |
| nizer ring | 119 | 82 | 16.5 | 2.0 | 18 | 0.115 | B |
| of the | 120 | 76 | 12.0 | 1.4 | 7 | 0.145 | |
| present | 121 | 84 | 16.0 | 1.6 | 14 | 0.130 | |
| invention | 122 | 82 | 16.5 | 1.9 | 18 | 0.125 | |
| | 123 | 86 | 17.0 | 2.2 | 26 | 0.100 | |
| | 124 | 74 | 15.0 | 1.6 | 13 | 0.140 | |
| | 14 | 62 | 10.0 | 1.6 | 31 | 0.095 | |
| compara- | 15 | 60 | 7.5 | 1.4 | 36 | 0.090 | |
| tive | 16 | 86 | 19.5 | 2.5 | 29 | 0.090 | B |
| sample | 17 | 64 | 9.0 | 1.0 | 17 | 0.135 | |
| | 18 | 81 | 18.5 | 2.2 | 51 | 0.090 | |
| compara- | 19 | 64 | 9.0 | 1.0 | 9 | 0.140 | B |
| tive | 20 | 81 | 7.5 | 0.9 | 31 | 0.120 | |
| sample | | | | | | | |
| | 125 | 72 | 19.5 | 2.4 | 18 | 0.120 | |
| | 126 | 84 | 18.0 | 2.1 | 16 | 0.125 | |
| | 127 | 90 | 15.5 | 1.8 | 13 | 0.125 | |
| Cu alloy | 128 | 72 | 17.0 | 2.0 | 19 | 0.110 | |
| for the | 129 | 95 | 9.5 | 0.9 | 10 | 0.130 | |
| synchro- | 130 | 82 | 16.5 | 2.4 | 26 | 0.110 | |
| nizer ring | 131 | 73 | 13.0 | 2.0 | 7 | 0.140 | C |
| of the | 132 | 82 | 17.0 | 2.0 | 26 | 0.100 | |
| present | 133 | 78 | 12.5 | 1.5 | 5 | 0.145 | |
| invention | 134 | 83 | 15.5 | 2.0 | 25 | 0.105 | |
| | 135 | 85 | 17.5 | 2.2 | 16 | 0.120 | |
| | 136 | 77 | 12.0 | 1.2 | 5 | 0.145 | |
| | 137 | 82 | 15.5 | 2.1 | 26 | 0.105 | |
| | 138 | 85 | 17.5 | 2.1 | 17 | 0.125 | |
| | 139 | 76 | 12.0 | 1.2 | 6 | 0.145 | |
| | 140 | 85 | 17.5 | 2.1 | 16 | 0.125 | |
| | 141 | 82 | 17.5 | 2.1 | 21 | 0.110 | |
| Cu alloy | 142 | 86 | 18.5 | 2.2 | 19 | 0.120 | |
| for the | 143 | 80 | 15.5 | 1.8 | 14 | 0.125 | |
| synchro- | 144 | 86 | 18.0 | 2.2 | 19 | 0.115 | |
| nizer ring | 145 | 82 | 16.0 | 1.8 | 9 | 0.125 | C |
| of the | 146 | 85 | 18.5 | 2.2 | 20 | 0.115 | |
| present | 147 | 84 | 18.5 | 2.0 | 17 | 0125 | |
| invention | 148 | 81 | 16.5 | 1.8 | 9 | 0.130 | |
| | 149 | 85 | 18.5 | 2.1 | 20 | 0.115 | |
| | 150 | 84 | 17.5 | 2.1 | 17 | 0.125 | |
| | 151 | 81 | 16.0 | 1.8 | 8 | 0.130 | |
| | 152 | 86 | 18.0 | 2.1 | 18 | 0.120 | |
| | 153 | 85 | 18.0 | 2.0 | 18 | 0.120 | |
| | 154 | 84 | 18.5 | 2.1 | 17 | 0.125 | |

TABLE 2-continued

| Sample No. | | TENSILE strength (kg/mm²) | Elongation (%) | Charpy impact strength (kg-m/cm²) | Amount of specific wear ($1 \times 10^{-7}$ mm²/kg-m) | Friction coefficient | Condition of wear test |
|---|---|---|---|---|---|---|---|
| | 155 | 85 | 18.5 | 2.1 | 18 | 0.120 | |
| | 156 | 80 | 16.0 | 2.1 | 16 | 0.110 | |
| Cu alloy | 157 | 87 | 17.0 | 2.1 | 15 | 0.125 | |
| for the | 158 | 81 | 16.5 | 2.0 | 17 | 0.105 | |
| synchro- | 159 | 84 | 17.5 | 2.2 | 15 | 0.120 | |
| nizer ring | 160 | 86 | 16.5 | 2.0 | 15 | 0.125 | C |
| of the | 161 | 81 | 16.0 | 2.1 | 17 | 0.110 | |
| present | 162 | 84 | 17.5 | 2.1 | 16 | 0.115 | |
| invention | 163 | 85 | 17.0 | 2.2 | 15 | 0.120 | |
| | 164 | 86 | 17.5 | 2.1 | 16 | 0.120 | |
| | 165 | 82 | 16.5 | 2.1 | 17 | 0.115 | |
| | 166 | 80 | 15.9 | 2.1 | 17 | 0.110 | |
| | 167 | 84 | 17.5 | 2.1 | 16 | 0.120 | |
| | 168 | 86 | 17.0 | 2.1 | 15 | 0.120 | |
| | 169 | 88 | 17.0 | 2.1 | 16 | 0.120 | |
| | 170 | 91 | 16.5 | 1.8 | 11 | 0.135 | |
| | 171 | 85 | 17.0 | 1.9 | 16 | 0.125 | |
| Cu alloy | 172 | 83 | 15.0 | 1.7 | 12 | 0.125 | |
| for the | 173 | 82 | 18.5 | 2.1 | 17 | 0.125 | |
| synchro- | 174 | 83 | 16.0 | 1.8 | 14 | 0.125 | |
| nizer ring | 175 | 82 | 15.5 | 1.7 | 9 | 0.125 | C |
| of the | 176 | 74 | 13.5 | 1.5 | 8 | 0.140 | |
| present | 177 | 72 | 12.5 | 1.4 | 7 | 0.145 | |
| invention | 178 | 84 | 16.0 | 1.8 | 13 | 0.125 | |
| | 179 | 85 | 17.0 | 2.1 | 15 | 0.120 | |
| | 180 | 86 | 17.5 | 2.1 | 14 | 0.125 | |
| | 181 | 84 | 17.5 | 2.2 | 27 | 0.105 | |
| | 182 | 78 | 14.5 | 1.6 | 7 | 0.135 | |
| Cu alloy | 183 | 83 | 17.5 | 2.1 | 26 | 0.105 | |
| for the | 184 | 73 | 13.0 | 1.4 | 6 | 0.145 | |
| synchro- | 185 | 85 | 17.0 | 2.0 | 18 | 0.120 | |
| nizer ring | 186 | 88 | 17.5 | 2.1 | 18 | 0.130 | C |
| of the | 187 | 86 | 17.0 | 2.1 | 6 | 0.140 | |
| present | 188 | 84 | 17.5 | 2.1 | 19 | 0.130 | |
| invention | 189 | 74 | 14.0 | 1.5 | 7 | 0.145 | |
| | 21 | 61 | 9.5 | 1.5 | 26 | 0.100 | |
| | 22 | 59 | 8.5 | 1.4 | 32 | 0.100 | |
| compara- | 23 | 85 | 18.0 | 2.3 | 31 | 0.100 | |
| tive | 24 | 67 | 9.5 | 1.0 | 16 | 0.145* | C |
| sample | 25 | 80 | 18.5 | 2.2 | 50 | 0.090 | |
| | 26 | 66 | 8.0 | 1.0 | 7 | 0.135* | |
| | 27 | 67 | 6.0 | 0.9 | 34 | 0.095 | |

*The mating member wore significantly.

EXAMPLE 2

Melts having the compositions noted in Table 3 were prepared by repeating the procedures described in Example 1. Test sections prepared from these melts were subjected to a heat treatment as effected in Example 1, thereby preparing sample Nos. 190–219 of the Cu alloy for use as the material of the synchronizer ring of the present invention, as well as comparative sample Nos. 28–41. The comparative samples were outside the scope of the present invention in terms of the amount of one or more constituent elements as marked with an asterisk in Table 3.

In order to evaluate the strength of alloys, sample Nos. 190–219 and comparative sample Nos. 28–41 were subjected to measurements of tensile strength. In order to evaluate the toughness of alloys, all samples were subjected to measurements of Charpy impact strength and elongation. Furthermore, in order to evaluate the wear resistance and synchronizing characteristics with respect to a mating member, the samples were subjected to a pin wear test conducted under the following conditions:

| | |
|---|---|
| Specimen: | pin 3 mm in diameter |
| Mating member: | carburized hardening steel (JIS SCM 420 with $H_RC$ of 61.5) |
| Oil: | gear oil No. 90 |
| Oil temperature: | 70° C. |
| Friction speed: | 3 m/sec |
| Pressure: | 80 kg/cm² |
| Sliding distance: | 1.5 km |

In the pin wear test, the amount of specific wear was measured. At the same time, friction coefficients were calculated from the data obtained with a torque meter. The results of all measurements are summarized in Table 4.

TABLE 3

| Sample No. | | Zn | Al | Mn | Si | Fe | Ni | Co | P | Mg | Ca | O₂ (ppm) | Cr | Pb | Sn | Cu + impurities |
|---|---|---|---|---|---|---|---|---|---|---|---|---|---|---|---|---|
| Cu alloy for the synchronizer ring of the present invention | 190 | 17.4 | 4.6 | 3.2 | 0.9 | — | 1.2 | — | 0.11 | — | — | 410 | — | — | — | bal. |
| | 191 | 30.1 | 3.4 | 2.9 | 1.0 | 0.2 | 0.4 | — | 0.09 | — | — | 430 | — | — | — | bal. |
| | 192 | 39.2 | 4.3 | 3.0 | 0.9 | — | 1.3 | — | 0.10 | — | — | 390 | — | — | — | bal. |
| | 193 | 26.5 | 2.1 | 3.1 | 0.9 | — | 1.2 | — | 0.11 | — | — | 33 | — | — | — | bal. |
| | 194 | 27.0 | 10.7 | 3.1 | 1.1 | — | 1.5 | — | 0.09 | — | — | 996 | — | — | — | bal. |
| | 195 | 27.3 | 4.2 | 0.53 | 1.0 | — | 1.4 | — | 0.03 | 0.03 | — | 415 | — | — | — | bal. |
| | 196 | 27.3 | 4.4 | 5.9 | 1.2 | — | 1.5 | — | 0.05 | 0.06 | 0.04 | 380 | — | — | — | bal. |
| | 197 | 26.6 | 4.4 | 2.8 | 0.12 | — | 1.3 | — | — | 0.11 | — | 32 | — | — | — | bal. |
| | 198 | 26.9 | 4.7 | 3.1 | 1.9 | — | 1.4 | — | — | 0.07 | 0.05 | 860 | — | — | — | bal. |
| | 199 | 27.1 | 4.6 | 2.9 | 0.8 | 0.13 | — | 0.11 | 0.10 | 0.08 | 0.03 | 420 | — | — | — | bal. |
| | 200 | 27.4 | 4.2 | 2.9 | 0.9 | — | 0.12 | 0.8 | 0.02 | 0.04 | 0.07 | 460 | — | — | — | bal. |
| | 201 | 26.8 | 4.5 | 3.1 | 1.2 | — | — | — | 0.11 | — | — | 390 | — | — | — | bal. |
| | 202 | 27.0 | 4.2 | 3.2 | 0.7 | 0.8 | 0.9 | — | 0.0032 | — | — | 470 | — | — | — | bal. |
| | 203 | 27.1 | 4.3 | 3.0 | 1.3 | 1.3 | — | — | — | 0.0034 | 0.0031 | 410 | — | — | — | bal. |
| | 204 | 27.1 | 4.3 | 2.8 | 1.1 | 0.5 | 1.0 | — | — | — | — | 430 | — | — | — | bal. |
| | 205 | 27.0 | 4.4 | 3.0 | 0.9 | — | — | 1.4 | — | — | — | 460 | — | — | — | bal. |
| | 206 | 27.3 | 4.3 | 3.1 | 1.1 | — | — | 1.2 | — | — | — | 440 | — | — | — | bal. |
| | 207 | 27.6 | 4.2 | 2.9 | 1.1 | 1.4 | — | 0.3 | 0.29 | 0.26 | 0.28 | 390 | — | — | — | bal. |
| | 208 | 26.9 | 4.6 | 3.1 | 1.1 | 0.5 | 0.5 | — | — | — | 0.13 | 470 | — | — | — | bal. |
| | 209 | 27.5 | 4.4 | 3.1 | 0.8 | 2.8 | — | 0.5 | 0.14 | 0.19 | — | 380 | 0.054 | — | — | bal. |
| | 210 | 27.4 | 4.3 | 3.3 | 0.7 | 0.1 | 0.6 | 1.0 | 0.10 | 0.16 | 0.05 | 510 | 0.53 | — | — | bal. |
| | 211 | 27.1 | 4.4 | 3.0 | 1.4 | 0.5 | 1.0 | — | — | — | — | 390 | 0.96 | — | — | bal. |
| | 212 | 27.6 | 4.5 | 3.5 | 0.7 | — | 2.7 | — | 0.11 | — | — | 430 | — | — | — | bal. |
| | 213 | 26.9 | 4.6 | 3.1 | 1.0 | — | — | 2.8 | 0.04 | 0.10 | 0.03 | 420 | — | 0.052 | 0.056 | bal. |
| | 214 | 27.2 | 4.4 | 3.3 | 0.9 | 1.0 | 0.1 | 1.8 | 0.05 | 0.01 | — | 420 | — | 0.9 | 1.9 | bal. |
| | 215 | 27.3 | 4.3 | 3.2 | 1.0 | 0.1 | 1.3 | 0.2 | — | 0.06 | 0.04 | 450 | 0.43 | — | 0.7 | bal. |
| | 216 | 26.8 | 4.1 | 3.3 | 1.0 | — | 1.0 | — | 0.06 | 0.08 | — | 460 | 0.67 | 0.8 | — | bal. |
| | 217 | 27.1 | 4.3 | 3.1 | 0.8 | — | 1.2 | — | 0.11 | 0.03 | 0.01 | 420 | — | 1.6 | — | bal. |
| | 218 | 27.2 | 4.2 | 3.0 | 0.9 | — | 1.1 | — | — | — | — | 390 | — | 0.6 | 0.5 | bal. |
| | 219 | 27.4 | 4.4 | 3.1 | 1.0 | — | 1.4 | — | 0.10 | 0.10 | — | 370 | — | — | — | bal. |
| comparative sample | 28 | 14.8* | 4.2 | 2.9 | 0.9 | — | 1.1 | — | 0.10 | 0.13 | 0.07 | 420 | — | — | — | bal. |
| | 29 | 26.9 | 1.5* | 3.0 | 1.1 | — | 0.9 | — | 0.12 | 0.05 | 0.006 | 410 | — | — | — | bal. |
| | 30 | 27.3 | 4.4 | * | 0.8 | — | 1.0 | — | — | — | 0.06 | 500 | — | — | — | bal. |
| | 31 | 27.4 | 4.3 | 3.1 | * | — | 1.1 | — | 0.06 | 0.13 | 0.13 | 460 | — | — | — | bal. |
| | 32 | 28.1 | 4.2 | 3.1 | 1.2 | — | * | — | 0.03 | 0.05 | — | 390 | — | — | — | bal. |
| | 33 | 27.6 | 4.2 | 2.9 | 0.9 | 3.4* | 3.5* | — | — | 0.05 | — | 370 | — | — | — | bal. |
| | 34 | 27.8 | 4.3 | 2.8 | 1.0 | — | — | 4.0* | 0.10 | * | * | 380 | — | — | — | bal. |
| | 35 | 28.0 | 4.5 | 3.0 | 1.1 | 1.0 | — | — | — | * | — | 420 | — | — | — | bal. |
| | 36 | 26.9 | 4.1 | 2.9 | 0.8 | 1.1 | 1.1 | 0.6 | 0.36* | 0.33* | — | 410 | — | — | — | bal. |
| | 37 | 27.3 | 4.4 | 3.2 | 0.8 | 0.5 | 0.5 | — | — | — | 0.34* | 440 | — | — | — | bal. |
| | 38 | 27.4 | 4.2 | 3.1 | 1.0 | — | 1.1 | — | — | — | — | 450 | — | — | — | bal. |
| | 39 | 27.4 | 4.1 | 2.9 | 1.1 | — | 1.4 | — | 0.11 | — | — | 390 | — | — | — | bal. |
| | 40 | 27.3 | 4.3 | 3.1 | 0.9 | — | 0.1 | — | 0.10 | — | — | 13* | — | — | — | bal. |
| | 41 | 27.2 | 4.2 | 3.0 | 1.8 | 1.3 | 0.1 | — | — | — | — | 1105* | — | — | — | bal. |

TABLE 4

| Sample No. | | Tensile strength (kg/mm²) | Elongation (%) | Charpy impact strength (kg-m/cm²) | Amount of specific wear (1 × 10⁻⁷ mm²/kg-m) | Friction coefficient |
|---|---|---|---|---|---|---|
| Cu alloy for the synchronizer ring of the present invention | 190 | 63 | 19 | 2.7 | 43 | 0.100 |
| | 191 | 71 | 23 | 2.5 | 36 | 0.105 |
| | 192 | 82 | 21 | 1.9 | 23 | 0.110 |
| | 193 | 62 | 19 | 2.6 | 46 | 0.095 |
| | 194 | 84 | 17 | 1.9 | 21 | 0.115 |
| | 195 | 68 | 21 | 2.2 | 42 | 0.100 |
| | 196 | 78 | 22 | 2.5 | 22 | 0.110 |
| | 197 | 67 | 20 | 2.1 | 41 | 0.100 |
| | 198 | 77 | 23 | 2.5 | 21 | 0.105 |
| | 199 | 68 | 20 | 2.3 | 40 | 0.100 |
| | 200 | 67 | 21 | 2.3 | 41 | 0.105 |
| | 201 | 68 | 20 | 2.2 | 41 | 0.100 |
| | 202 | 74 | 22 | 2.5 | 30 | 0.105 |
| | 203 | 64 | 20 | 2.1 | 38 | 0.095 |
| | 204 | 65 | 20 | 2.0 | 37 | 0.090 |
| | 205 | 64 | 21 | 2.0 | 38 | 0.095 |
| | 206 | 79 | 19 | 1.8 | 32 | 0.115 |
| | 207 | 77 | 18 | 1.9 | 33 | 0.115 |
| | 208 | 78 | 19 | 1.9 | 32 | 0.105 |
| | 209 | 76 | 19 | 1.9 | 28 | 0.105 |
| | 210 | 78 | 17 | 1.8 | 34 | 0.105 |
| | 211 | 74 | 20 | 2.0 | 28 | 0.115 |
| | 212 | 72 | 22 | 2.4 | 20 | 0.120 |
| | 213 | 71 | 21 | 2.4 | 23 | 0.110 |
| | 214 | 65 | 19 | 2.0 | 18 | 0.120 |
| | 215 | 71 | 22 | 2.4 | 42 | 0.110 |
| | 216 | 67 | 19 | 2.1 | 31 | 0.115 |
| | 217 | 66 | 19 | 1.9 | 34 | 0.120 |
| | 218 | 63 | 18 | 1.7 | 26 | 0.120 |
| | 219 | 67 | 20 | 1.9 | 25 | 0.115 |
| Comparative sample | 28 | 57 | 21 | 2.2 | 62 | 0.090 |
| | 29 | 52 | 23 | 2.3 | 68 | 0.085 |
| | 30 | 58 | 22 | 2.2 | 63 | 0.090 |
| | 31 | 60 | 23 | 2.2 | 61 | 0.095 |
| | 32 | 64 | 25 | 2.6 | 58 | 0.095 |
| | 33 | 78 | 19 | 2.1 | 27 | 0.105 |
| | 34 | 77 | 19 | 2.0 | 28 | 0.115 |
| | 35 | 79 | 18 | 1.8 | 27 | 0.115 |
| | 36 | 66 | 25 | 2.3 | 36 | great variance over 0.080–0.135 |
| | 37 | 78 | 15 | 1.3 | 59 | 0.105 |
| | 38 | 79 | 13 | 1.2 | 59 | 0.100 |
| | 39 | 77 | 12 | 1.3 | 61 | 0.100 |
| | 40 | 72 | 24 | 2.6 | 58 | great variance over 0.085–0.135 |
| | 41 | 52 | 11 | 1.1 | 34 | 0.115 |

The results summarized in Table 4 show that sample Nos. 190–219 of the Cu alloy for use as the material of the synchronizer ring of the present invention are high in both strength and toughness while exhibiting high wear resistance and friction coefficient. On the other hand, comparative sample Nos. 28–41 which are outside the scope of the present invention in terms of the amount of one or more constituent elements are inferior to the samples of the present invention with respect one or more of the characteristics mentioned above.

As discussed on the foregoing pages, the synchronizer ring made of the Cu alloy of the present invention has high strength and toughness and exhibits high wear resistance and friction coefficient. Therefore, an automotive speed variator that is smaller in size, lighter in weight and which produces a larger output can be realized by employing the synchronizer ring of the present invention.

What is claimed is:

1. A synchronizer ring made of a wear-resistant Cu alloy having high strength and toughness, said alloy consisting essentially of on a weight basis of 17–40% Zn, 2–11% Al and 50–3,000 ppm of oxygen, 0.1–3.5% of at least one of Ti, Zr and V, 0.003–0.3% Mg and at least one optional element selected from the group consisting of (a) 0–3% of at least one of Fe, Ni and Co, (b) 0–0.3% of at least one of P and Ca, (c) 0–2.5% Sn, (d) 0–0.5% Si, (e) 0–4% Mn and (f) 0–1.5% Pb, with the balance being Cu and incidental impurities, and having a structure wherein intermetallic compounds and oxides are uniformly dispersed in a matrix.

2. The synchronizer ring according to claim 1 which contains at least one of Fe, Ni and Co in an amount of 0.02–3% by weight.

3. The synchronizer ring according to claim 1 which contains at least one of P, and Ca, the total amount of Mg and said at least one of P and Ca being 0.003–0.3% by weight.

4. The synchronizer ring according to claim 1 which contains Sn and Si in respective amounts of 0.05–2.5% by weight and 0.005–0.5% by weight.

5. The synchronizer ring according to claim 1 which contains Mn in an amount of 0.1–4% by weight.

6. The synchronizer ring according to claim 1 which contains Pb in an amount of 0.05–1.5% by weight.

7. A synchronizer ring made of a wear-resistant Cu alloy having high strength and toughness, said alloy consisting essentially of on a weight basis of 17–40% Zn, 2–11% Al, 0.5–6% Mn, 0.1–2% Si, 0.1–3% of at least one of Fe, Ni and Co, 0.003–3% of Mg, 30–1,000 ppm of oxygen, and at least one optional element selected from the group consisting of (i) 0–1% Cr and (ii) 0–2% of at least one of Pb and Sn, and the balance being Cu and incidental impurities, and having a structure wherein intermetallic compounds and oxides are uniformly dispersed in a matrix.

8. The synchronizer ring according to claim 7 which contains Cr in an amount of 0.05–1% by weight.

9. The synchronizer ring according to claim 7 which contains at least one of Pb and Sn in an amount of 0.05–2% by weight.

10. The synchronizer ring according to claim 7 which also contains at least one of P and Ca, the total amount of Mg and said at least one of P and Ca being 0.003–0.3%.

* * * * *